Patented Aug. 11, 1936

2,050,908

UNITED STATES PATENT OFFICE 2,050,908

PROCESS OF PURIFYING DISTILLED ALCOHOLIC SPIRITS

Herman F. Willkie, Windsor, Ontario, Canada, assignor to Continental Distilling Corporation, Philadelphia, Pa., a corporation of Delaware No Drawing. Application November 28, 1933, Serial No. 700,151

3 Claims. (Cl. 99—48)

My invention relates to a process for the maturation of spiritous liquors, and more particularly it relates to a process by which spiritous liquors in the vapor phase are treated to remove therefrom the contaminating materials which render the liquors harsh, raw, and irritating in flavor and odor.

The principal object of the present invention is to provide a simple and economical process for the treatment of all types of spiritous liquors, including ethyl alcohol to be mixed with extracts or blended with other materials for beverage purposes, by which the undesirable constituents including the unsaturated compounds found in the liquors after distillation may be chemically converted into desirable, or at least harmless, compounds.

Still another object of my invention is to furnish a process for the maturation of spiritous liquors by which the liquors will be rendered potable by a chemical process in a very short time, as compared to the aging in wooden casks or barrels consuming many years as is practiced at the present time.

Other objects will be apparent from a consideration of the specification and claims.

As is well known, freshly distilled liquors and ethyl alcohol have a raw, harsh, irritating taste and odor which renders them unpotable. Heretofore, storage in wooden casks for a period of years has been resorted to in order that the liquors might be fully matured, five or six years being usually the accepted period for producing a liquor, for example whisky, of the most satisfactorily pleasing odor and taste. The accepted process has been to take the spiritous liquor as it runs from the distilling equipment, reduce it if required with distilled water to the desired strength, for example a strength of approximately 50% alcohol by volume, and place it in white oak wooden barrels of approximately forty-five gallons capacity. These barrels in the case of American whisky are usually charred on the inside while in the manufacture of Scotch and Irish, the uncharred barrels are employed. These filled barrels are then placed in warehouses for a period of years until the whisky is matured.

It will be readily seen that the cost of barrels and storage with even a moderate size distillery runs into tremendous figures. The barrels must be made of hard white oak of very carefully selected quality, and the cost of the barrels averages about ten cents (10¢) per gallon of the liquor being stored, while the original construction cost of the warehouse amounts to five cents (5¢) to ten cents (10¢) per gallon. Another very serious difficulty in this maturing process is the loss by evaporation which varies from 25% to 50% depending upon the temperature maintained in the warehouse. Thus it will be seen that in the case of a 50% loss, it will be necessary, in order to sell one million gallons of spiritous liquors to manufacture two million gallons, the cost per gallon due to this loss of storage thus doubling the original cost of the spirits manufactured. It is obvious, therefore, that the extended length of time required for maturation plus the loss by evaporation entails a very heavy investment in inventories, approximately ten times the yearly volume of sales being held in storage. Due to the changing taste of the public with respect to spiritous liquors, it is impossible to ascertain five or six years in advance a demand in the trade for a particular blend or brand. Hence, ofttimes, large stocks of a particular brand are carried for which it is difficult at the time of consumption to find a market. For example, in the case of the falling off in trade of a particular brand, inventories which would normally be sufficient for five or six years' consumption may become sufficient for as much as twenty-five years', in which case the evaporation losses in storage begin to exceed by far the liquors sold.

The process of the present invention involves a chemical treatment in which the spiritous liquor in the vapor phase, and oxygen, are brought into intimate contact by means of a catalytic agent and a chemical reaction brought about between undesirable materials in the liquor and the oxygen. I have ascertained that contaminants which give the raw, harsh taste to spiritous liquors and irritate the mucous membrane are for the most part unsaturated compounds such as allyl alcohol and acrolein. The treatment of the liquors in the vapor phase with oxygen in the presence of the catalytic agent oxidizes the contaminants to desirable or harmless compounds.

With the process of the present invention complete maturation may be accomplished in a very short time, it only being necessary to pass the vapors through a layer of the catalytic agent of sufficient depth. The matured liquor is entirely comparable in taste and flavor to the corresponding blend stored in wooden barrels for many years until matured. The present invention eliminates the evaporation losses incurred in storage in barrels and the investment involved in barrels, warehouses, and large inventories. When the process of the present invention is employed, it is possible in a very short time to meet changes in the demands of the trade for a particular blend or brand.

The term "spiritous liquor" as employed herein contemplates all the so-called distilled liquors including whisky, brandy, rum, gin, and liqueurs, as well as ethyl alcohol employed in the manufacture of alcoholic beverages. For example, ethyl alcohol treated in accordance with the present invention may be mixed with extracts or blended with other distilled liquors to form the spiritous liquor desired. The spiritous liquor is vaporized by the application of sufficient heat and the liquor in the vapor phase is brought into contact with the oxygen and the catalytic agent. The oxygen may be in a pure form or in a diluted form, the use of air being applicable. Porous carbon has been found to be a highly satisfactory catalytic agent, although other materials unaffected by the spiritous liquors and the contaminating materials, which present a large surface exposure, may be employed, for example silica gel and the like. Any porous carbon, free from materials which will contaminate the spiritous liquor, may be used such as that obtained from vegetable materials or animal materials including bone char. Purified petroleum coke may also be used if desired. Activated carbon, for example, that made from coconut shells, is particularly applicable due to the large number of pores contained therein. The catalytic agent is preferably employed in the form of porous granules, although other forms may be utilized if it is desired. The catalytic agent is chemically inert and is capable of furnishing surface contact between the spiritous liquor vapor and the oxygen to cause chemical conversion of undesirable ingredients into desirable constituents. As time is the essence of the invention, and as the efficiency of the many catalytic agents will vary, the amount of catalytic agent to be employed may vary largely, depending upon the effectiveness of the particular agent.

Since, however, the chemical reaction involved depends upon the bringing of the liquor in the vapor phase and the oxygen together simultaneously and in intimate contact, by means of the catalytic agent, it is only necessary to have the catalytic agent present in sufficient amounts to insure the desired contact, and the contact will be maintained until the undesirable contaminants are removed or converted.

The process is preferably carried out in conjunction with the distillation of the fermented mash containing the spiritous liquors and conveniently the catalyzing chamber is placed between the still and the condenser. The catalytic agent in the chamber, preferably in granular form, is arranged in such manner as to insure contact of the vapors therewith and at the same time to present as little resistance to the passage of the vapor as possible. It may advantageously be arranged on racks or trays. The catalyzing chamber is also constructed so that no vapor will be condensed therein, and the chamber, therefore, is externally heated if desired and in any event it is insulated. The oxygen is admitted to the chamber in sufficient amounts depending on the rate of flow of the spiritous vapors to bring about the maturation. The passage of oxygen through the chamber may either be in the direction of the flow of the vapors or countercurrently therewith, although for manipulative reasons the former is preferred. If it is inconvenient or for other reasons it is not desired to maturate at the time the distillation of the fermented mash is carried out, the process may be performed independently thereof, in which case the spiritous liquor in vapor phase and the oxygen are brought into intimate contact by means of the catalytic agent in any suitable apparatus.

The process of the present invention may be carried out in any suitable apparatus which is inert to the liquors being treated. For example, a stainless steel, a wooden, or a ceramic or glass-lined container may be utilized. The temperature at which the process is carried out varies with the alcohol content of the vapors and may be altered as desired by changes in pressures so long as the spiritous liquor is maintained in the vapor phase. The pressure may be atmpospheric or lower as convenient; for example, a vacuum distillation system may be used with catalyzing chamber as described. Obviously, the temperature must not reach the point at a given pressure where the production of undesirable compounds due to the decomposition of the alcohol itself occurs. The dilution may also vary widely, for example from 95% alcohol to a liquor containing 40% alcohol or lower. In general, the larger the amount of alcohol present the more rapid will be the reaction. For this reason, it is usually not advantageous to employ a dilution lower than 40% alcohol. The treatment of the spiritous liquors in the vapor phase with oxygen brought into intimate contact by the catalytic agent is carried out until it is determined by taste and odor tests that the harsh irritants have been removed from the liquor. The time for complete maturation depends upon the amount of impurities present; on the contact obtained between the spiritous liquor and the oxygen; on the temperature at which the treatment is carried out; and on the dilution, but in all cases due to treatment of the spiritous liquor in the vapor phase, the time is a matter of a few seconds or less.

At times, it will be desirable to impart the woody flavor characteristic of whisky matured in barrels or casks to the spiritous liquors including the ethyl alcohol treated in accordance with the present invention. The woody flavor may be imparted to the spiritous liquor by condensing it in the presence of, or by treating it in the liquid phase with, chips of, or finely divided, wood, preferably hard white oak. If it is desired to give whisky, for example, a flavor comparable to that of Scotch or Irish whisky, uncharred wood is employed. On the other hand, if a flavor corresponding to an American whisky is desired, charred wood is utilized. The spiritous liquor during the treatment in this case will extract the woody materials in the same manner as they are extracted from the barrels.

In a specific case where the catalyzing chamber is employed between the still and the condenser, the fermented mash from which the spiritous liquor is to be recovered is placed in a still which is heated sufficiently to cause vaporization. The vapors pass from the still into the catalyzing chamber which is three and one-half feet inside diameter containing 150 pounds of activated coconut-shell carbon arranged therein on trays or racks so that the vapors must pass through successive layers of the catalytic agent. The vapors enter the catalyzing chamber through a twelve inch pipe at a rate brought about by the distillation of 5,000 gallons of spiritous liquor per hour and oxygen is admitted at the bottom of the catalyzing chamber at the rate of ten cubic feet per hour. In the case of alcohol vapors which condense to a spiritous liquor of 120 proof, the temperature at which the vapors enter the catalyzing chamber is approximately 195° F. The temperature in the catalyzing chamber is maintained sufficiently high to avoid the condensation of the spiritous liquors in the chamber. The time of contact of the spiritous liquor, the catalyst, and the oxygen is only momentary and when the vapors leave the chamber and enter the condenser they will be found to be fully maturated and free from the harsh, irritating contaminants.

The present invention due to the simultaneous bringing together of the spiritous liquor in the vapor phase, and the oxygen in intimate contact by means of the catalytic agent accomplishes in a few seconds or less what previously has required four years and upwards, the product of the present invention being as satisfactory in flavor and odor as that previously obtained. The success of the present process depends on intimate contact of the materials afforded by the use of spiritous liquors in the vapor phase. In the process, therefore, the catalytic agent will be present in such amounts that at the end of the process all of the spiritous liquor vapors will have been brought into contact with it.

This application is a continuation in part of my co-pending application Serial No. 670,995 filed May 13, 1933 which has been abandoned in view of this application.

Considerable modification is possible in the spiritous liquors treated as well as in the method of treatment and in the physical factors employed without departing from the essential features of the present invention.

I claim:

1. The process of purifying distilled alcoholic spirits which comprises heating the liquors above the boiling point thereof to cause vaporization thereof, passing said spiritous liquor in the vapor phase and gaseous oxygen at a pressure not substantially greater than atmospheric into a chamber inert to the liquors being treated and containing a non-metallic chemically inert catalytic agent of large surface area capable of furnishing contact between the spiritous liquor in the vapor phase and the gaseous oxygen to cause chemical conversion of the undesirable, unsaturated ingredients, such as allyl alcohol and acrolein, into desirable constituents, maintaining an intimate contact between said spiritous liquor in the vapor phase and gaseous oxygen by means of said catalytic agent until a chemical reaction has freed the spirituous liquor in the vapor phase from the said undesirable, unsaturated ingredients without oxidation of any appreciable amount of the alcohol of said vapors, and thereafter condensing the spiritous liquor in the vapor phase to the liquid phase.

2. The process of purifying distilled alcoholic spirits which comprises heating the liquors above the boiling point thereof to cause vaporization thereof, passing said spiritous liquor in the vapor phase and gaseous oxygen at a pressure not substantially greater than atmospheric into a chamber inert to the liquors being treated and containing a metal-free highly porous carbon capable of furnishing surface contact between the spiritous liquor in the vapor phase and the gaseous oxygen to cause chemical conversion of the undesirable, unsaturated ingredients, such as allyl alcohol and acrolein, into desirable constituents, maintaining an intimate contact between said spirituous liquor in the vapor phase and gaseous oxygen by means of said highly absorbent carbon until a chemical reaction has freed the spiritous liquor in the vapor phase from the said undesirable, unsaturated ingredients without oxidation of any appreciable amount of the alcohol of said vapors, and thereafter condensing the spiritous liquor in the vapor phase to the liquid phase.

3. The process of purifying distilled alcoholic spirits which comprises heating the liquors above the boiling point thereof to cause vaporization thereof, passing said spiritous liquor in the vapor phase and gaseous oxygen at a pressure not substantially greater than atmospheric into a chamber inert to the liquors being treated and containing metal-free activated coconut-shell carbon of a large surface area capable of furnishing contact between the spiritous liquor in the vapor phase and the gaseous oxygen to cause chemical conversion of the undesirable, unsaturated ingredients, such as allyl alcohol and acrolein, into desirable constituents, maintaining an intimate contact between said spirituous liquor in the vapor phase and gaseous oxygen by means of said activated coconut-shell carbon until a chemical reaction has freed the spiritous liquor in the vapor phase from the said undesirable, unsaturated ingredients without oxidation of any appreciable amount of the alcohol of said vapors, and thereafter condensing the spiritous liquor in the vapor phase to the liquid phase.

HERMAN F. WILLKIE.